United States Patent
Kuki et al.

(10) Patent No.: US 6,914,948 B2
(45) Date of Patent: Jul. 5, 2005

(54) MEDIA NOISE POST-PROCESSOR WITH VARYING THRESHOLD

(75) Inventors: Ryohei Kuki, Tokyo (JP); Koshiro Saeki, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/273,833

(22) Filed: Mar. 22, 1999

(65) Prior Publication Data

US 2004/0037372 A1 Feb. 26, 2004

(51) Int. Cl.[7] .................................................. H03D 1/00
(52) U.S. Cl. ........................................................ 375/341
(58) Field of Search ................................ 375/229, 230, 375/287, 286, 341, 340, 316, 346, 350, 261, 263, 290; 369/53.1; 455/334, 130, 296, 308, 307; 327/80, 77, 50

(56) References Cited

U.S. PATENT DOCUMENTS

| 5,521,945 | A | | 5/1996 | Knudson |
| 5,689,532 | A | | 11/1997 | Fitzpatrick |
| 5,844,741 | A | * | 12/1998 | Yamakawa et al. ........... 360/65 |
| 5,961,658 | A | * | 10/1999 | Reed et al. .................... 360/40 |
| 6,052,248 | A | * | 4/2000 | Reed et al. .................... 360/41 |
| 6,185,175 | B1 | * | 2/2001 | Zook ............................. 360/53 |

FOREIGN PATENT DOCUMENTS

JP 06232768 A 8/1994

* cited by examiner

Primary Examiner—Tesfaldet Bocure
Assistant Examiner—Pankaj Kumar
(74) Attorney, Agent, or Firm—W. Daniel Swayze, Jr.; W. James Brady; Frederick J. Telecky, Jr.

(57) ABSTRACT

A post-processing method and circuit (30) for correcting media noise errors and producing a corrected recovered data output signal (49) is disclosed for use in a sampled data read channel of a mass data storage device. The mass data storage device has a Viterbi detector (34) that receives actual sampled partial response target data (32) from a data medium of a mass data storage device. A recovered partial response target signal derived from the recovered data output signal and the sampled partial response target data is filtered to produce a filtered output signal (51). A threshold circuit (64) provides a threshold against which the filtered output signal is compared, and a predetermined value (60) is added to the filtered output signal when a predetermined error event pattern due to media noise or other transition jitter occurs in the recovered data output signal (35). The recovered data output signal is modified (70) when the filtered output signal exceeds the threshold of said threshold circuit (64).

9 Claims, 7 Drawing Sheets

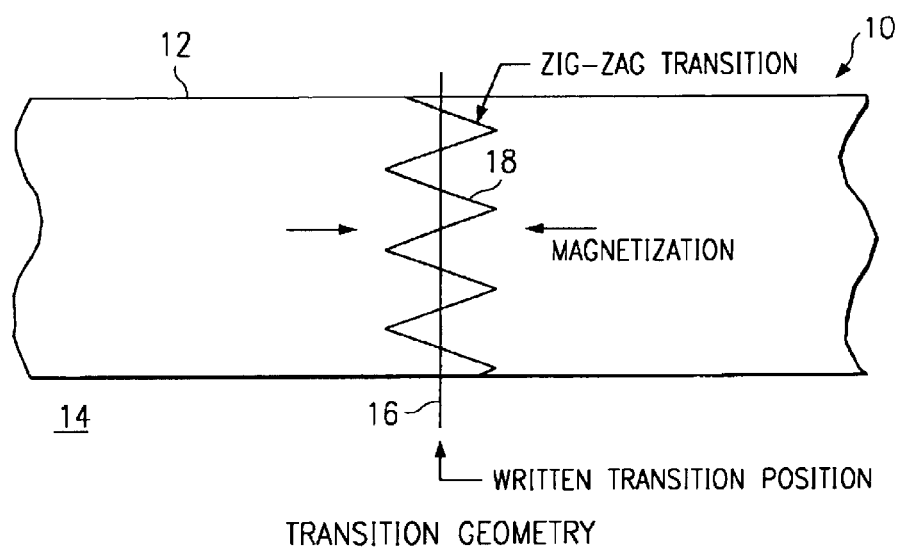
TRANSITION GEOMETRY
FIG. 1
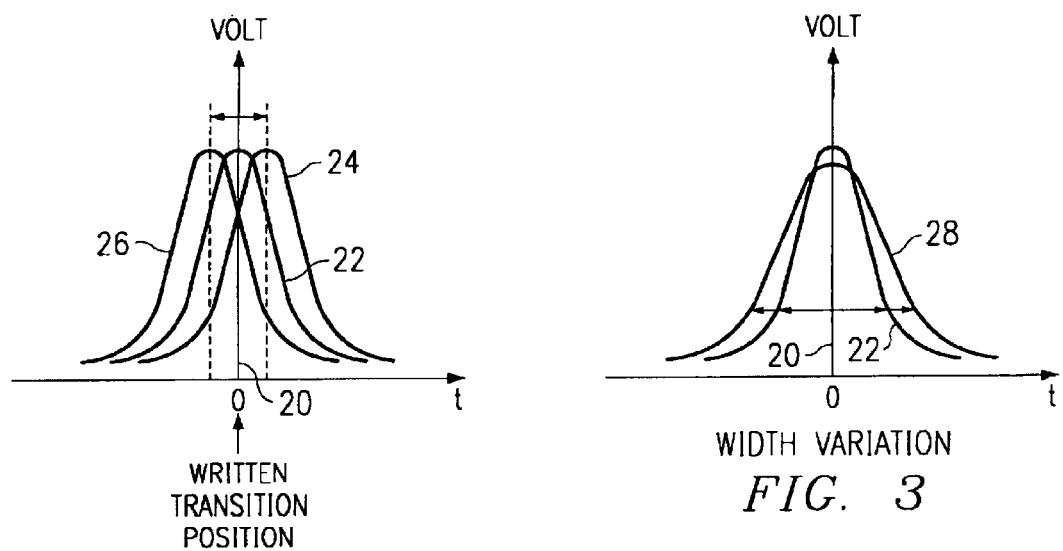
POSITION JITTER
FIG. 2
WIDTH VARIATION
FIG. 3
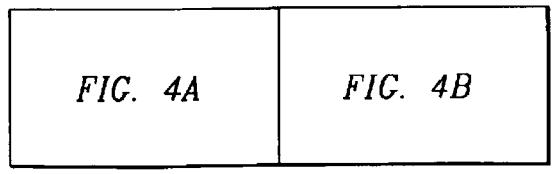
FIG. 4
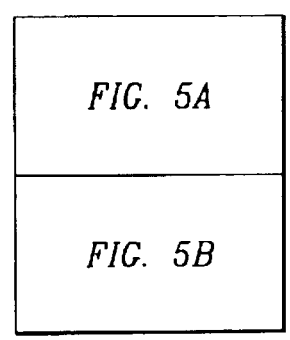
FIG. 5

MEDIA NOISE POST-PROCESSOR WITH VARYING THRESHOLD

BACKGROUND OF THE INVENTION

1. Field of the Invention

This invention relates to improvements in methods and apparatuses for dynamic information storage or retrieval, and more particularly to improvements in methods and circuitry for detection and correction of errors caused by media noise or other transition jitter, especially in information storage and retrieval systems that use a magnetic data storage medium, and still more particularly to improvements in methods and apparatuses for improving data detection in dynamic information storage or retrieval systems of the type that use post-processor data detection techniques.

2. Relevent Background

In the construction of dynamic information storage or retrieval devices, or the like, and in particular in the construction of the data channel used in digital magnetic recording systems, or the like, such as hard disk drives used in conjunction with digital computer systems, or the like, there has been significant recent interest in Partial Response Maximum-likelihood (PRML) signaling techniques. The most common PRML systems are PR4ML (a partial response class 4) and EPR4ML (extended partial response class 4). Maximum-likelihood detectors, which use a Viterbi algorithm, are generally used for these partial response channels.

In such systems, the use of EPR4 Viterbi data detection techniques is widely used. EPR4 or EFPR4 Viterbi detectors are well known, and involve probabilistic techniques for determining data states in the data channel. As data rates increase in the data channel, it becomes increasingly difficult to distinguish adjacent data pulses, and the Viterbi techniques have been found to be very useful.

Unfortunately, significant errors still occur in data detection. For example, using EPR4 techniques, a bit error rate (BER) of about $10^{-5}$ typically occurs. However it has been observed that if the signal to noise ratio in a system could be increased by, for example, only 1 dB, the bit error rate can be improved to $10^{-6}$. This represents an order of magnitude improvement. Thus, even small improvements in the signal-to-noise ratio can result in large improvements in the bit error rate using EPR4 detection techniques. This is significant since presently the requirements exist for the provision of circuits that have a bit error rate less than $10^{-7}$, and it is expected that this requirement will continue to become more stringent.

In order to enhance the BER (bit error rate) performance, recently, post-processors have been incorporated with the Viterbi detector. An example of such post-processor is that shown in U.S. patent application Ser. No. 09/229,945, filed Jan. 13, 1999, entitled POST-PROCESSOR USING A NOISE WHITENED MATCHED FILTER FOR A MASS DATA STORAGE DEVICE, OR THE LIKE, by the inventors hereof, assigned to the assignee hereof, and incorporated herein by reference. However, in recent disk drives that have a high recording density, the media noise from the magnetic disk has become an important factor that is difficult to ignore.

The media noise arises primarily from written magnetic transitions, which typically have a zigzag transition geometry. The zigzag transition geometry produces position or pulse width uncertainties or "jitter" variations of read back signals. When media noise is dominant, it is difficult for such post-processors to improve performance, since the characteristic of media noise is quite different from white noise. The spectrum of the media noise is not white, and is dependent on the data pattern written on the magnetic disk.

What is needed, therefore, is a post-processor that is effective for media noise in information storage and retrieval systems that use a magnetic data storage medium.

SUMMARY OF THE INVENTION

In light of the above, therefore, one of the advantages realized by the invention is that media noise or other transition jitter arising in an information storage and retrieval systems that uses a magnetic data storage medium can be controlled, using a post-processor in the read channel of the system.

Thus, according to a broad aspect of the invention, a post-processing method is presented for use in a sampled data read channel of a mass data storage device. The mass data storage device has a Viterbi detector that receives actual sampled partial response target data from a data medium of the mass data storage device. A recovered partial response target signal derived from the recovered data output signal and the sampled partial response target data is filtered to produce a filtered output signal, and a threshold circuit is provided to compare the filtered output signal against a predetermined threshold. When a predetermined error event pattern due to media noise or other transition jitter occurs in the recovered data output signal, a predetermined value is added to the filtered output signal, influencing the magnitude of the filtered output signal with respect tot he threshold. The recovered data output signal is modified when the filtered output signal exceeds the threshold of the threshold circuit.

According to another broad aspect of the invention, a sampled data detection technique is presented for use in a mass data storage device to correct for media noise or other transition jitter. The method includes detecting an actual sampled partial response target from a transducer head of the mass data storage device which has been equalized to a partial response level of at least EPR4 in a Viterbi detector having a partial response detection level of at least EPR4 to produce a recovered data output signal. The actual sampled partial response target signal is delayed for a time substantially equal to a time required by the Viterbi detector to generate the recovered data output signal from the actual sampled partial response target signal to produce a delayed actual sampled partial response target signal. The recovered data output signal is converted to a partial response level of the actual sampled data output signal to produce a converted recovered partial response target signal, and the converted recovered partial response target signal is subtracted from the delayed actual sampled partial response target signal to produce an error signal. The occurrence of a predetermined error event pattern in the recovered data output signal is determined to produce a filtered output signal, and a predetermined value is added to the filtered output signal when a predetermined error event pattern due to media noise or other transition jitter occurs in the recovered data output signal. The recovered data output signal is modified when the filtered output signal exceeds the threshold of the threshold circuit.

According to yet another broad aspect of the invention, a post-processor circuit is presented for use in a sampled data read channel of a mass data storage device of the type that uses a Viterbi detector that receives an actual sampled partial response target signal from a storage medium of the mass data storage device to produce a recovered data output signal. The circuit includes an error pattern detector to generate an error pattern event indicating signal if a predetermined error event pattern occurs in the sampled partial response target signal, and a circuit for generating an error signal based upon a difference between the recovered data output signal and a delayed the actual sampled partial response target signal. A circuit is provided for adding a predetermined value to the error signal when a predetermined error event pattern due to media noise or other transition jitter occurs in the recovered data output signal, and a threshold circuit generates an error correction control signal if a magnitude of the error signal exceeds a predetermined threshold. An error correction circuit modifies the recovered data output signal when the error correction control signal and the error event pattern indicating occurrence signal are generated.

BRIEF DESCRIPTION OF THE DRAWING

The invention is illustrated in the accompanying drawings, in which:

FIG. 1 is a diagram of a portion of a track of a magnetic storage medium, illustrating a "zigzag" jitter deviation of the data pattern recorded on the medium, illustrating one of the media noise situations addressed by the present invention.

FIG. 2 is a graph showing time vs. voltage showing variations in transition position due to position jitter resulting from the zigzag transition geometry shown in FIG. 1.

FIG. 3 is a graph showing time vs. voltage, illustrating typical variations in pulse width variations arising in the read back signals resulting from variations in position geometry shown in FIG. 1.

In the various figures of the drawings, like reference numerals are used to denote like or similar parts.

DETAILED DESCRIPTION OF THE PREFERRED EMBODIMENTS

Figure 4A:
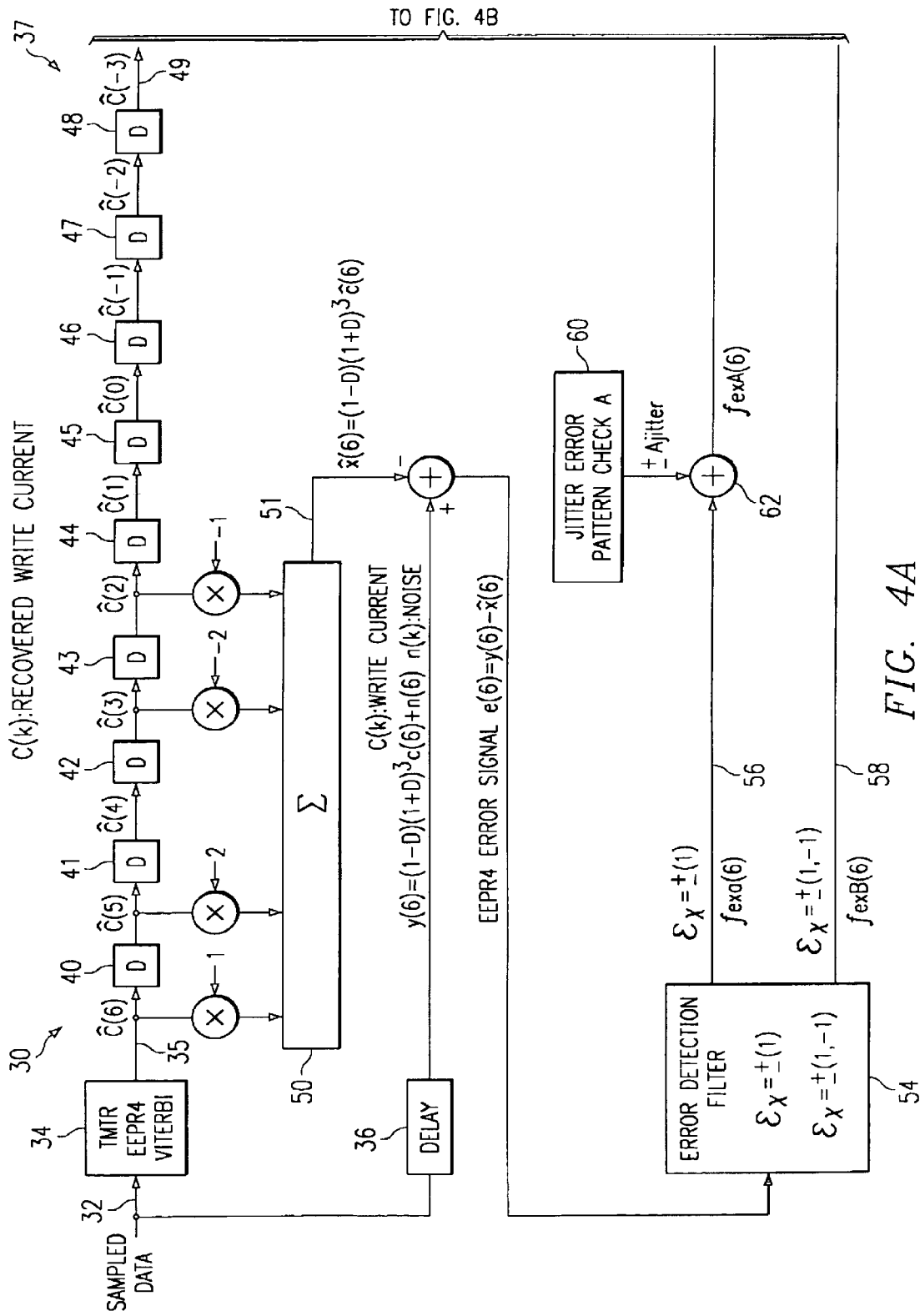
FIG. 4 is a block diagram of a circuit for use in a detecting and correcting jitter errors in a read back signal in an EEPR4 channel, in accordance with a preferred embodiment of the invention.

A diagram of a portion 10 of a track 12 of a magnetic storage medium 14, illustrating a "zigzag" jitter deviation of the data pattern recorded on the medium, illustrating one of the media noise situations addressed by the present invention, is shown in FIG. 1. It is, of course, desired that the magnetization pattern representing data or other information recorded onto the track 12 be located at a precise, predetermined location, denoted by the transverse line 16. However, due to many factors, including those described below, the magnetization pattern may have a zigzag transition configuration 18, which, for the reasons described below in detail, gives rise to media noise when the data is attempted to be read.

A time vs. voltage graph illustrating the variations in the position of the data transitions written onto the storage medium due to position jitter resulting from the zigzag transition geometry shown in FIG. 1 is shown in FIG. 2. As shown, the proper written transition position is that of the center location denoted by the axis line 20. The magnetization pattern on each side of the axis 20 follows a generally Gaussian shaped pattern 22. However, due to the position jitter that occurs, the Gaussian waveforms that actually result are moved to the left and right of the center axis 20, as shown by the curves 24 and 26. Thus, a resulting voltage difference results between the peaks of the curves 24 and 26, which represents uncertainty in the position of the data read from the storage medium on which it is written. In the worst-case, this uncertainty may result in the data being miss-read.

In addition to position jitter, pulse width variations may arise in the read back signals from variations and position geometry of the recorded signals. This is shown in the graph of FIG. 3, in which the normal curve 22 which represents the data written to be centered on the axis 20, in fact, appears as if the data pattern were spread to produce the waveform 28. The wider data waveform pattern increases the probability inter-symbol interference (ISI), which, also, can result in the data being miss-read.

Thus, the post-processor is a dedicated detector following the Viterbi detector to distinguish a few predetermined data patterns. Generally, the number of dominant error patterns of the Viterbi detector is very limited. The post-processor is designed to detect only these dominant error patterns. If the detection result of both detectors is different in the predetermined data patterns, the result of the post-processor may be selected so that the post-processor corrects the output data of the Viterbi detector. It can therefore be appreciated that the post-processor must have better performance in these pre-determined error patterns than the Viterbi detector.

In recent high recording density disk drives, it is difficult to ignore the media noise or other transition jitter from the magnetic disk. The media noise arises from written magnetic transitions which typically have a zigzag transition geometry, as described above with reference to FIG. 1. The zigzag transition geometry typically arises from position jitter and the pulse width variation of read back signals, as described above with reference to FIGS. 2 and 3.

When the media noise is dominant, it is difficult for such a post-processor, such as that as shown in the above referenced application, Ser. No. 09/229,945 to improve performance, since the characteristics of the noise is different from white noise to which the post-process of said application Ser. No. 09/229,945 is directed. The spectrum of media noise generally is not white, and is dependent at least in part on the data pattern written to the magnetic disk. (The errors due to the white noise depends on the data pattern, but the amount of the white noise itself does not depends on the data pattern; however, the amount of the media noise depends on the data pattern.) Thus, ideally, the media noise circuit herein described can be advantageously used to supplement the post-processor of said application Ser. No. 09/229,945.

Referring now to a preferred embodiment of the media noise post-processing circuit and method of the invention, it should be noted that although the embodiment described below is an EEPR4 channel example with a Trellis 8/9 code (or TMTR 8/9 code), the technique of this invention can be applicable to various other PRML channels.

Table 1 shows the error event rate of error patterns of a Trellis 8/9 code EEPR4 Viterbi detector having 100% media noise. (Assuming that the media noise is position jitter noise, the sigma of the position jitter=0.1/Td)

TABLE 1

| | error pattern (in code) | | | Error event rate | |
|---|---|---|---|---|---|
| 1 | 0110 | -> | 0000 | 4.8E-5 | 60.9% |
| 2 | 0111 | -> | 0001 | 8.3E-6 | 10.5% |
| 3 | 0111 | -> | 0100 | 8.3E-6 | 10.5% |
| 4 | 0111 | -> | 0010 | 2.1E-6 | 2.7% |
| 5 | 0100 | -> | 0010 | 2.0E-6 | 2.5% |
| 6 | 0010 | -> | 0100 | 2.0E-6 | 2.5% |
| 7 | Others | | | 7.9E-6 | 10.4% |

The error patterns shown in the Table 1 are code patterns, with the code "1" arising when a magnetic transition occurs in the EEPR4 channel, and the code "0" arising when no transition occurs. In the Trellis 8/9 code, the maximum number of the consecutive "1" run length is limited to three. In general, the Viterbi detection error occurs in patterns in which the Euclidean distances between the correct path and the wrong path is small. However, when the media noise is dominant, the Viterbi detection error is controlled by both the Euclidean distance and the magnetic transition pattern.

It can be seen from Table 1 that the error patterns in rows 1–3 are the dominant error patterns of the Viterbi detector, counting respectively for 60.9%, 10.5% and 10.5% event rates. The three dominant error patterns have the worst Euclidean distance in the EEPR4 channel and also includes the consecutive 2 or 3 transitions, which suggests that a large amount of media noise exists.

The error event rate of the opposite direction of the three dominant error patterns listed above are shown in Table 2

TABLE 2

| Error pattern (in code) | | | Error event rate |
|---|---|---|---|
| 1' | 0000 | -> | 0110 | 1.3E-10 |
| 2' | 0001 | -> | 0111 | 2.7E-15 |
| 3' | 0100 | -> | 0111 | 2.7E-15 |

The error event rates of the error patterns of rows 1' to 3' are very small because these four bits patterns include a zero or one transition. (The reason why the "0000" pattern has small errors is due to the media noise from data patterns which are adjacent to the "0000" pattern.) According to the present invention, a direction dependence of the error rate is utilized.

For an error pattern 1, the data of Table 3 applies:

TABLE 3

| Error pattern (in code) | | | Error event rate |
|---|---|---|---|
| 0110 | -> | 0000 | 4.8E-5 |
| 0000 | -> | 0110 | 1.3E-10 |

These error patterns are expressed in code. The error patterns at the read channel input are converted by the write flip-flop circuit. Thus, the error patterns at the read channel input are as shown in Table 4:

TABLE 4

| From code | To | Channel input |
|---|---|---|
| 0110 | -> | 00100 or 11011 |
| 0000 | -> | 00000 or 11111 |

The 0110→0000 error becomes either:
(1). 00100→00000 error or (2). 11011→11111 error
The 0000→0110 error becomes either
(3). 00000→00100 error or (4). 11111→11011 error The patterns (1) and (2) are bad error rate patterns, and the patterns (3) and (4) are low error rate patterns. The error (1) 00100→00000 arises when a large negative noise comes to the error pattern sequence ("1" is erased). The error (3) 00000→00100 arises when a large positive noise comes to the error pattern sequence ("1" is generated).

The error rates of these examples are:
error (1): 00100→00000 2.4E-5
error (3): 00000→00100 6.5E-11
(error(1)+error(3)=2.4E-5)

If some positive value (+A) is added to the error pattern sequence (1), the error rate will be remarkably reduced because the large negative noise that causes the error is compensated. If the same +A is added to the error pattern sequence (3), the error rate will increase, but the media noise of the error pattern (3) is very small, and the increase of the error rate is acceptable, if the value of +A is selected appropriately.

When the value of the +A is optimized, the error rate of (1) and (3) will be
error (1) 00100→00000 5E-8
error (3) 00000→00100 5E-8
(error (1)+error(3)=1E-7)

The error rate of (1) decreases about 3 orders of magnitude, the error rate of (3) increases about 3 orders of magnitude, and the total error rate of the two error patterns is improved about 2 orders of magnitude.

When the "00000" pattern is detected from the Viterbi detector output, The center bit of the "00000" pattern is the most suspicious. It has an error rate of 2.4E-5, but it is not known whether this bit is true or false. However, it can be assumed that the other four bits are true. Therefore, if the "00X00" pattern (X is 0 or 1) is detected from the output of the Viterbi detector, and the value of +A is added to the detector of the post-processor to compensate the media noise, we can expect the error rate improvement of error (1).

The error (2) 11011→11111 arises when a large positive noise exists in the error pattern sequence ("1" is generated). The error (4) 11111→11011 arises when a large negative noise exists in the error pattern sequence ("1" is erased). Thus, when the Viterbi detector outputs "11X11" pattern, in these error patterns, the performance can be improved by adding -A. The error rate of the error patterns of rows 2 and 3 of Table 1 can be improved in the same way.

Figure 4B:
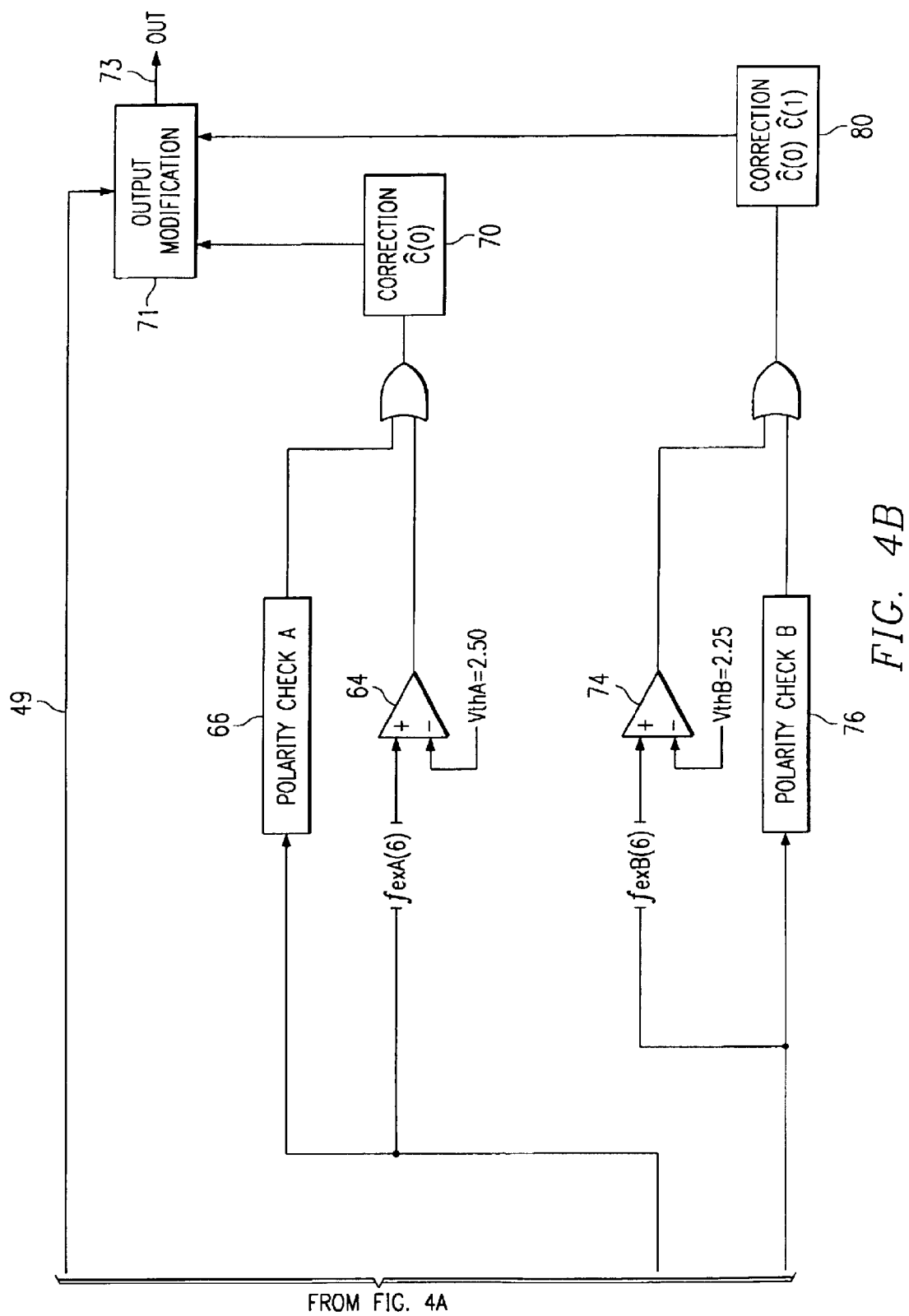

An example of a block diagram of a post-processor of the invention is shown in FIG. 4. The post-processor is similar to that shown in patent application Ser. No. 09/229,945, and includes additional circuitry for media noise reduction. Thus, the post-processor in FIG. 4 is effective for both AWGN (white noise) and media noise.

More particularly, a block diagram circuit 30 is shown in FIG. 4, which represents is a data correction circuit in a sampled data read channel of a mass data storage device (not shown). The data detection and correction circuit 30, which is effective to detect and correct media noise errors, receives sampled data on the input line 32, which represents the equalized write current of the data storage medium. The sampled data provides an input to an EEPR4 Viterbi detector 34, and to a delay circuit 36. The output from the Viterbi detector 34 represents the recovered write current, the respective sequential recovered write current samples being denoted by "k".

The recovered write current is applied to a filter 37, which includes a series of delay elements 40–48 that delay the respective samples of the recovered write current at the outputs from the Viterbi 34, each for a delay time D. The delay time, D, corresponds to the sample period of the sampled data on the input line 32, and, as known, corresponds to a delay operator, equal to $e^{j\omega\Box}$, where w is frequency, and $\Box$ is delay time. The filter 37 may be an FIR filter, as shown. The inputs to the delay blocks 40, 41, 43, and 44 are multiplied by weighting factors 1, 2, –2, –1, respectively, and are summed by a summer circuit 50. The output from the summer 50 is a filtered output signal derived on the output line 51.

The output from the summer circuit 50 is subtracted from the output of the delay circuit 36 to produce an error signal on line 52. The error signal provides an input to an error detection filter 54, which can detect the occurrence of the errors $ex=\pm(1)$ and $ex=\pm(1,-1)$. The errors $ex=\pm(1)$ and $ex=\pm(1,-1)$ from the error detection filter 54 are provided as respective outputs on lines 56 and 58.

The signals on output line 56, which represents the error $ex=\pm(1)$ are added to a predetermined value, and more particularly to the jitter error pattern ±A, box 60, in adder 62. The absolute value of the summed the signal is compared to a threshold voltage of 2.50 volts in comparator 64. Concurrently, the polarity of the summed signal is the determined by a polarity checking circuit 66. The output from the comparator 64 is logically or'd with the output from the polarity checking circuit 66 to form the correction data, indicated by box 70. The correction is made to modify the output signal on line 49 in an output modification circuit 71 to produce an output signal on output lin3 73 when the threshold of the filtered signal, with the added jitter error pattern check, exceeds the threshold of the threshold detector 64.

The absolute value of the summed the signal on line 58, which represents the error $ex=\pm(1,-1)$, is compared to a threshold voltage of 2.25 volts in comparator 74. Concurrently, the polarity of the summed signal is the determined by a polarity checking circuit 76. The output from the comparator 74 is logically or'd with the output from the polarity checking circuit 76 to form the correction data, indicated by box 80. The corrected data is also applied to the output modification circuit 71 to produce the modified output on line 73.

The error patterns in rows 1, 2, and 3 of Table 1 are classified into $ex=\pm(1)$ error pattern. Then in order to improve the media noise performance only, we can remove the $ex=\pm(1,-1)$ detection filter and the peripheral circuits. The error detection filters can be optimized for AWGN. When suspicious pre-determined patterns which may have the error due to the media noise are detected from the register (c6 to c-3) of the Viterbi detector output, the value of +A or –A is added to the output of the $ex=\pm(1)$ detection filter.

The value of A depends on the ratio of the media noise and the AWGN, but may be preset in the programmable media noise compensation register. The error patterns to be detected from the Viterbi detector output are shown in the following table 5.

TABLE 5

| Recovered Write Current $\hat{c}(k)$ | | | | | | | |
|---|---|---|---|---|---|---|---|
| k | –3 | –2 | –1 | 0 | 1 | 2 | 3 | Output |
| X | 0 | 0 | X | 0 | 0 | X | Ajitter |
| 1 | 1 | 0 | X | 0 | 0 | X | |
| X | 0 | 0 | X | 0 | 1 | 1 | |
| X | 1 | 1 | X | 1 | 1 | X | –Ajitter |
| 0 | 0 | 1 | X | 1 | 1 | X | |
| X | 1 | 1 | X | 1 | 0 | 0 | |
| Others | | | | | | | 0 |

The output of the polarity check circuit 60 may be generated in accordance wit the following table 6:

TABLE 6

| Polarity Check | | | | Correction | |
|---|---|---|---|---|---|
| Amplitude | Polarity | $\hat{c}(0)$ | $\hat{c}(1)$ | $\hat{c}(0)$ | $\hat{c}(1)$ |
| \|fexA(6)\|>VthA | FexA(6) > 0 | 0 | X | 1 | X |
| | FexA(6) < 0 | 1 | X | 0 | X |
| \|FexB(6)\|>VthA | FexA(6) > 0 | 0 | 1 | 1 | 0 |
| | FexA(6) < 0 | 1 | 0 | 0 | 1 |

The three dominant error patterns in code shown in Table 1 become six error patterns in the read channel input.

Figure 5A:
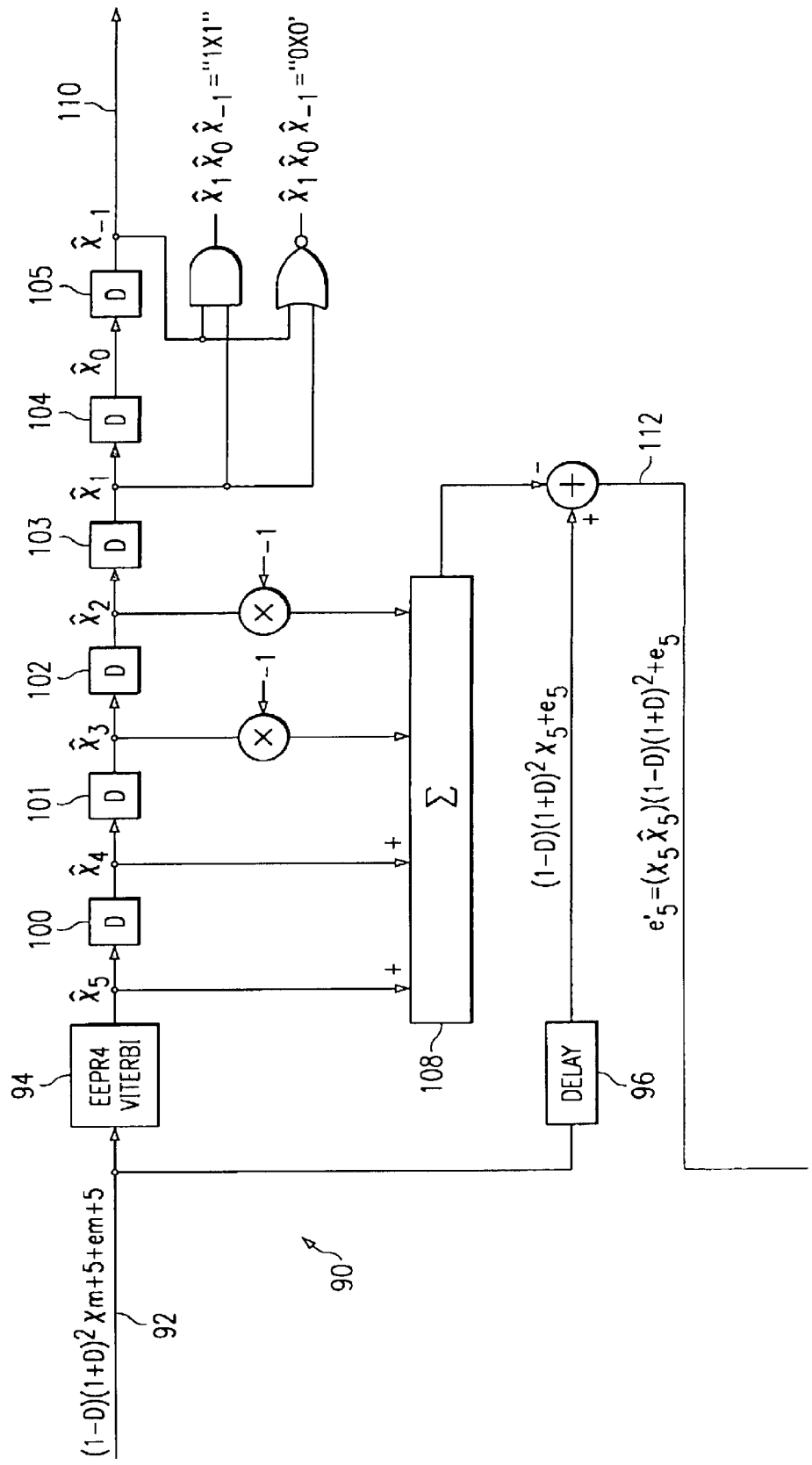
FIG. 5 is a block diagram of another circuit for use in a detecting and correcting jitter errors in a read back signal using an EPR4 channel using a preset value of +A or –A to be added when ex=±1 at the output of the error detection filter, in accordance with another preferred embodiment of the invention.
Figure 5B:
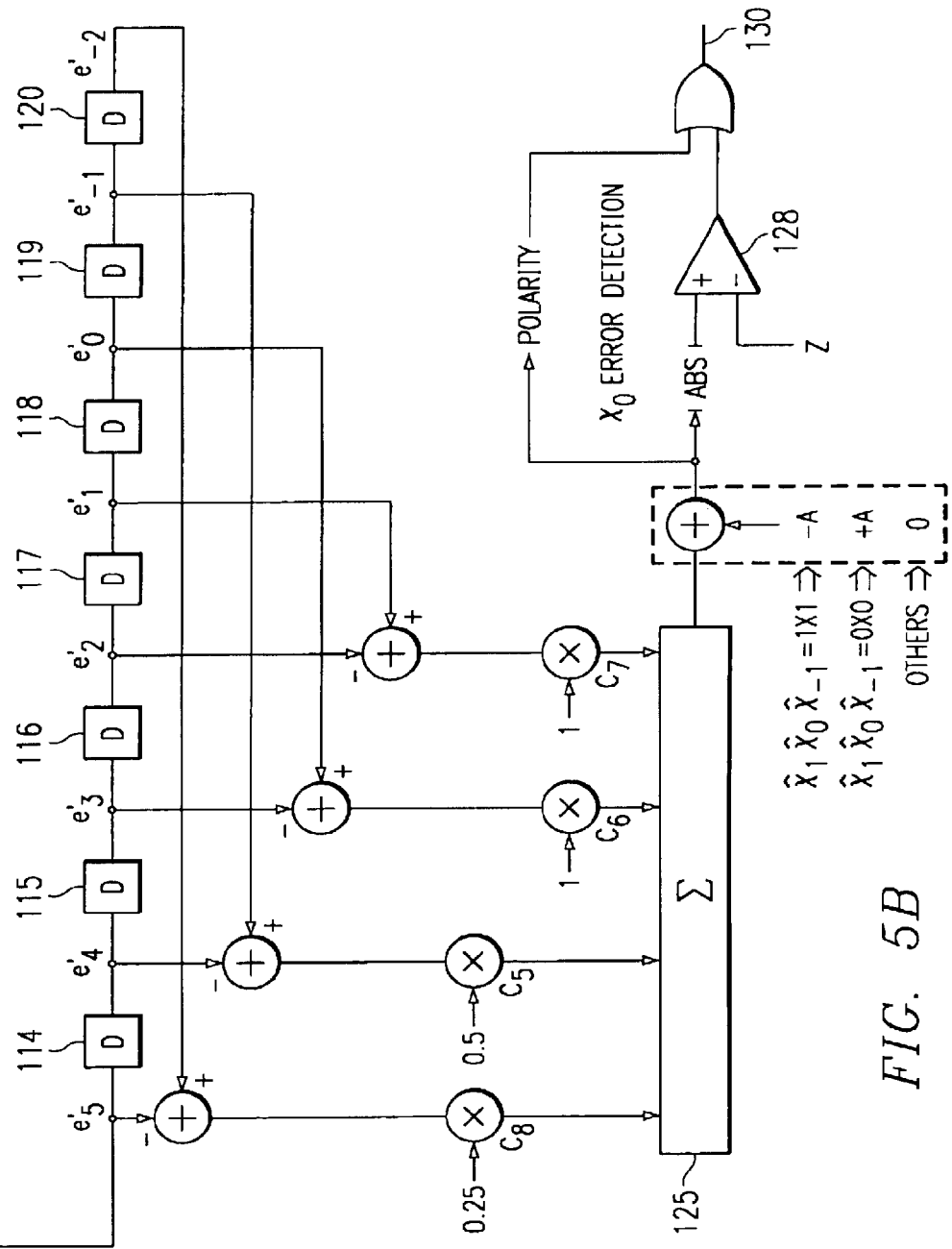

The circuit 90 shown in FIG. 5 is an example of another application of this invention to the EPR4 channel. In this case, when the "0X0" and "1X1" patterns are detected from the Viterbi detector output, the pre-set value +A or –A is added to the $ex=\pm(1)$ error detection filter.

The circuit 90 of FIG. 5 represents a postprocessor used in a 16/17 EPR 4 $ex=\pm(1)$ detector with media noise cancellation. The input to the system on input line 92 represents the samples output, for example, from the equalizer of a mass data storage device (not shown). The sampled signal on line 92 is connected to the inputs of an EPR 4 Viterbi detector 94 and a delay circuit 96. The output from the Viterbi detector 96 is connected to a series of delay circuits 100–105. The outputs from the delay circuit 105 on line 110 represents the detected signal from the Vitirbi detector, and its logical and with the input to the delay circuit 104 represents the "1X1" condition mentioned above. The logical or of the output signal on line 110 with the inputs to the delay circuit 104 represents the "0X0" condition also mentioned above.

The input lines to the delay circuits 100, 101, 102, and 103 are summed in a summer 108. The inputs to the delay circuit 102 and 103 are weighted by a –1 weighting factor, prior to being summed in the summer 108.

The output from the summer 108 is subtracted from the output of the delay circuit to 96 to produce an error signal on line 112. The signal on the line 112 is connected to a number of serially connected delay blocks 114—120. The input to the delay circuit 114 is subtracted from the output of the delay circuit 120, the input to the delay circuit 115 is subtracted from the output of delay circuit 119, the input to delay circuit 116 is subtracted from the output of the delay circuit 118, and the inputs to the delay circuit 117 is subtracted from the output of the delay circuit 117. The subtracted signals are weighted by respective weights 0.25, 0.5, 1, and 1, and are summed in a summer circuit 125. Depending upon the particular signal, the output from the summer is added to –A, +A., or 0, for a signal "1X1", "0X0" or any others, respectively. The absolute value of the summed signal is compared to a threshold value of 2 in a threshold detector 128. The output from the threshold detector 128 is logically or'd with a signal representing the polarity of the summed signal to determine the correction value on output line 130. The value of A depends on the ratio of the media noise and the AWGN, but may be preset in the programmable media noise compensation register. The error patterns to be detected from the Viterbi detector output are shown in the following Table 7.

TABLE 7

| k | Recovered Write Current ĉ(k) | | | Output |
|---|---|---|---|---|
| | −1 | 0 | 1 | |
| | 0 | X | 0 | Ajitter |
| | 1 | X | 1 | −Ajitter |
| | Others | | | 0 |

The polarity check correction values are straightforward, since the recovered write current is either 0 or 1, and may be established as shown in the following Table 8:

TABLE 8

| Polarity check | | |
|---|---|---|
| Amplitude | Polarity | Correction |
| \|fexA\| > VthA | FexA > 0 | 0    1 |
| | FexA < 0 | 1    0 |

Figure 6:
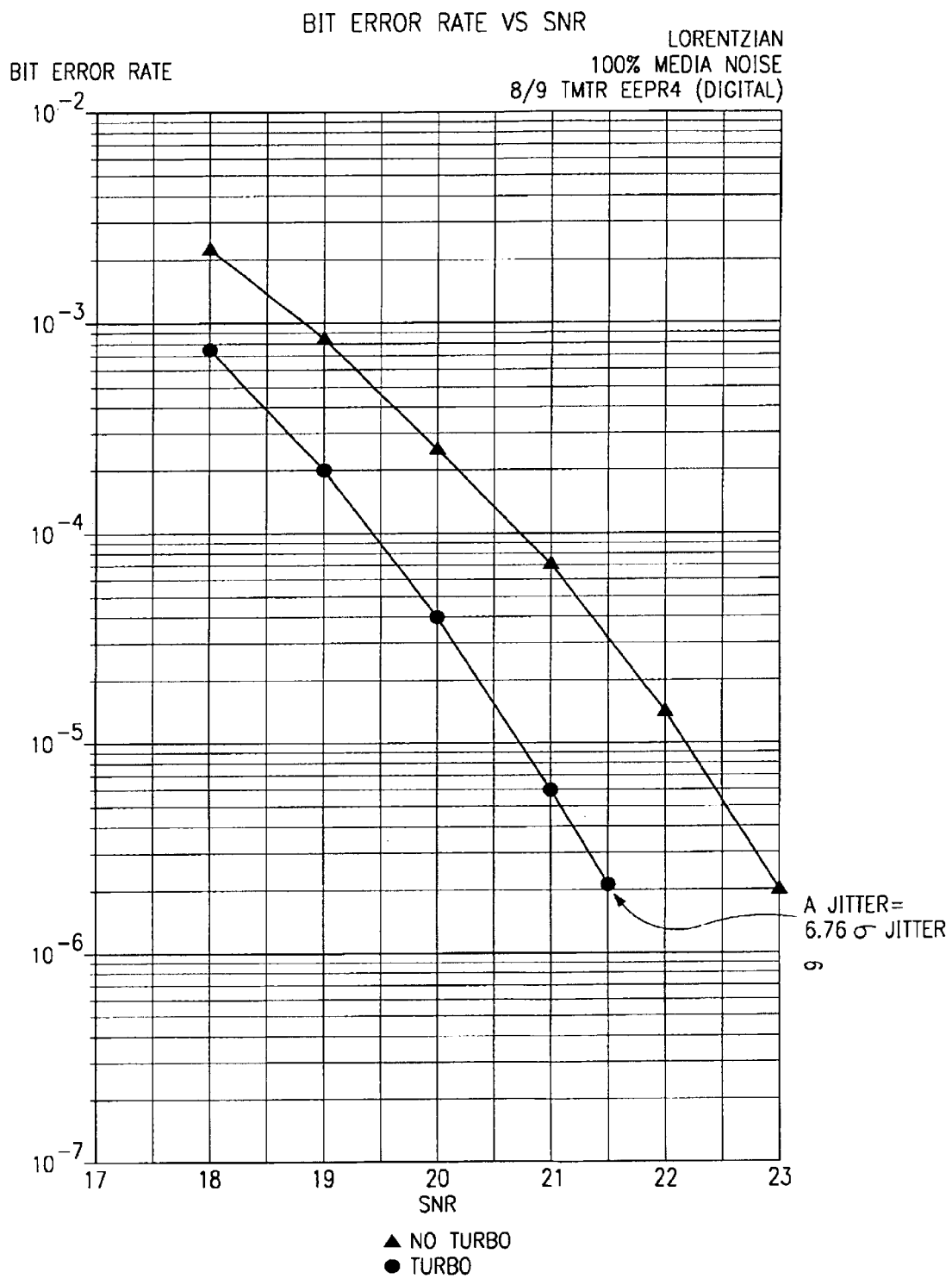
FIG. 6 is a graph showing the ratio of peak jitter vs. bit error rate (BER) comparing the improvement realized in a circuit using a postprocessor with a circuit not using a postprocessor for correction of jitter noise.
Figure 7:
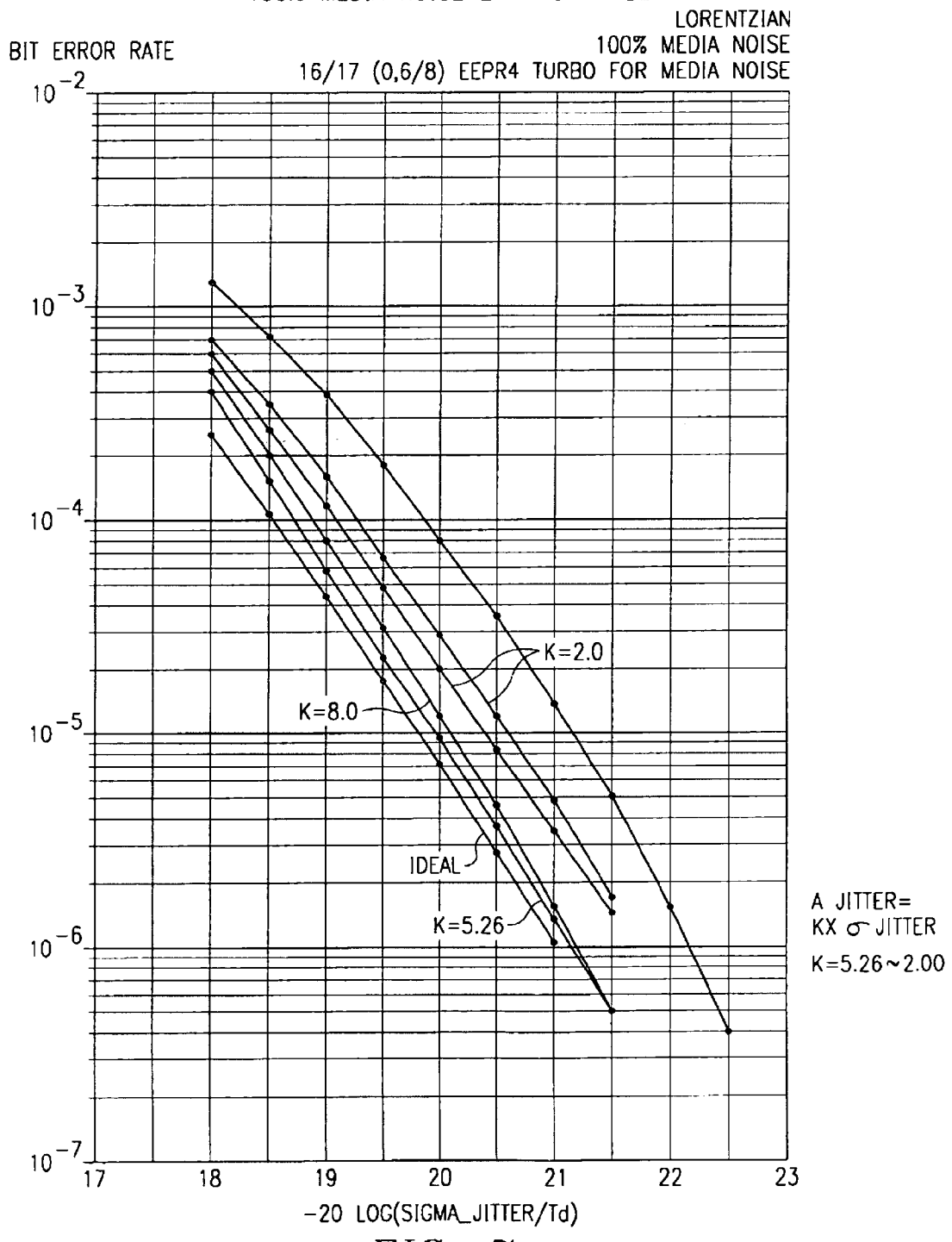
FIG. 7 is a graph showing a ratio of peak jitter vs. bit error rate (BER), comparing the ideal to various coefficients in an EEPR4 channel, in accordance with a preferred embodiment of the invention.

The bit error rate simulation results are shown in FIG. 6 and FIG. 7 for the EEPR4 channel and the EPR4 channel in 100% media noise.

It will be appreciated that the method of the invention can be used to improve the performance of the position jitter type noise induced by the media noise. The recent high density and high data rate disk drives suffer from position jitters of read back signals caused by the other sources. One such source is the write signal jitter. The write signals must be written to precisely the right position, but the actual write pulse signals have small random jitter elements induced by the system noise and various other interference producing causes.

Another jitter source is the write current asymmetry. The write current applied to the write magnetic head must be symmetrical (+ to − transition, and − to + transition) to write to the correct position of the data medium, but the rise time and the fall time of actual write current are not always symmetrical.

Another problem is a non-linear transition shift. Even if the write signals are written in the correct positions, the adjacent magnetization may interfere, and the correct positions of read back signals are shifted. This may cause the degradation of the error rate performance. The method of this invention is also effective for them.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A post-processing method for correcting media noise errors and producing a recovered data output signal, for use in a sampled data read channel of a mass data storage device that has a Viterbi detector that receives actual sampled partial response target data from a data medium of the mass data storage device, comprising:

filtering a recovered partial response target signal derived from said recovered data output signal and said sampled partial response target data to produce a filtered output signal;

providing a threshold circuit to provide a threshold against which said filtered output signal is compared;

adding a predetermined value to the filtered output signal when a predetermined error event pattern due to media noise occurs in said recovered data output signal;

and modifying the recovered data output signal when said filtered output signal exceeds the threshold of said threshold circuit, wherein said predetermined value in an EEPR4 channel is determined from the following tables:

| Recovered Write Current ĉ(k) | | | | | | | | |
|---|---|---|---|---|---|---|---|---|
| k | −3 | −2 | −1 | 0 | 1 | 2 | 3 | Output |
| | X | 0 | 0 | X | 0 | 0 | X | Ajitter |
| | 1 | 1 | 0 | X | 0 | 0 | X | |
| | X | 0 | 0 | X | 0 | 1 | 1 | |
| | X | 1 | 1 | X | 1 | 1 | X | −Ajitter |
| | 0 | 0 | 1 | X | 1 | 1 | X | |
| | X | 1 | 1 | X | 1 | 0 | 0 | |
| | Others | | | | | | | 0 |

| Polarity Check | | | | Correction | |
|---|---|---|---|---|---|
| Amplitude | Polarity | ĉ(0) | ĉ(1) | ĉ(0) | ĉ(1) |
| *fexA(6) *>VthA | FexA(6) > 0 | 0 | X | 1 | X |
| | FexA(6) < 0 | 1 | X | 0 | X |
| *FexB(6) *>VthA | FexA(6) > 0 | 0 | 1 | 1 | 0 |
| | FexA(6) < 0 | 1 | 0 | 0 | 1 | wherein the polarity check correction table is logically or'd with the output of the recovered write current ĉ(k) table to produce a correction value where x is either 1 or 0.

2. The method of claim 1 wherein said Viterbi detector is an Extended Partial Response Class 4 Viterbi detector.

3. A post-processing method for correcting media noise errors and producing a recovered data output signal, for use in a sampled data read channel of a mass data storage device that has a Viterbi detector that receives actual sampled partial response target data from a data medium of the mass data storage device, comprising:

filtering a recovered partial response target signal derived from said recovered data output signal and said sampled partial response target data to produce a filtered output signal;

providing a threshold circuit to provide a threshold against which said filtered output signal is compared;

adding a predetermined value to the filtered output signal when a predetermined error event pattern due to media noise occurs in said recovered data output signal;

and modifying the recovered data output signal when said filtered output signal exceeds the threshold of said threshold circuit, wherein said predetermined value in an EPR4 channel is determined from the following table:

| | Recovered Write Current $\hat{c}(k)$ | | | Output |
|---|---|---|---|---|
| k | −1 | 0 | 1 | |
| | 0 | X | 0 | Ajitter |
| | 1 | X | 1 | −Ajitter |
| | Others | | | 0 | and the polarity is determined from the following table:

| Polarity check | | |
|---|---|---|
| Amplitude | Polarity | Correction |
| *fexA* > VthA | FexA > 0 | 0    1 |
| | FexA < 0 | 1    0 | where x is either 1 or 0.

4. A sampled data detection technique for use in a mass data storage device for correcting for media noise, comprising:

detecting an actual sampled partial response target from a transducer head of said mass data storage device which has been equalized to a partial response level of at least EPR4 in a Viterbi detector having a partial response detection level of at least EPR4 to produce a recovered data output signal;

delaying said actual sampled partial response target signal for a time substantially equal to a time required by said Viterbi detector to generate said recovered data output signal from said actual sampled partial response target signal to produce a delayed actual sampled partial response target signal;

converting said recovered data output signal to a partial response level of said actual sampled data output signal to produce a converted recovered partial response target signal;

subtracting said converted recovered partial response target signal from said delayed actual sampled partial response target signal to produce an error signal;

determining the occurrence of a predetermined error event pattern in said recovered data output signal to produce a filtered output signal;

adding a predetermined value to the filtered output signal when a predetermined error event pattern due to media noise occurs in said recovered data output signal;

and modifying the recovered data output signal when said filtered output signal exceeds the threshold of said threshold circuit, wherein said predetermined value in an EEPR4 channel is determined from the following tables:

| | Recovered Write Current $\hat{c}(k)$ | | | | | | | Output |
|---|---|---|---|---|---|---|---|---|
| k | −3 | −2 | −1 | 0 | 1 | 2 | 3 | |
| | X | 0 | 0 | X | 0 | 0 | X | Ajitter |
| | 1 | 1 | 0 | X | 0 | 0 | X | |
| | X | 0 | 0 | X | 0 | 1 | 1 | |
| | X | 1 | 1 | X | 1 | 1 | X | −Ajitter |
| | 0 | 0 | 1 | X | 1 | 1 | X | |
| | X | 1 | 1 | X | 1 | 0 | 0 | |
| | Others | | | | | | | 0 |

| Polarity Check | | | | Correction | |
|---|---|---|---|---|---|
| Amplitude | Polarity | $\hat{c}(0)$ | $\hat{c}(1)$ | $\hat{c}(0)$ | $\hat{c}(1)$ |
| *fexA(6) *>VthA | FexA(6) > 0 | 0 | X | 1 | X |
| | FexA(6) < 0 | 1 | X | 0 | X |
| *FexB(6) *>VthA | FexA(6) > 0 | 0 | 1 | 1 | 0 |
| | FexA(6) < 0 | 1 | 0 | 0 | 1 | wherein the polarity check correction table is logically or'd with the output of the recovered write current $\hat{c}(k)$ table to produce a correction value where x is either 1 or 0.

5. A sampled data detection technique for use in a mass data storage device for correcting for media noise, comprising;

detecting an actual sampled partial response target from a transducer head of said mass data storage device which has been equalized to a partial response level of at least EPR4 in a Viterbi detector having a partial response detection level of at least EPR4 to produce a recovered data output signal;

delaying said actual sampled partial response target signal for a time substantially equal to a time required by said Viterbi detector to generate said recovered data output signal from said actual sampled partial response target signal to produce a delayed actual sampled partial response target signal;

converting said recovered data output signal to a partial response level of said actual sampled data output signal to produce a converted recovered partial response target signal;

subtracting said converted recovered partial response target signal from said delayed actual sampled partial response target signal to produce an error signal;

determining the occurrence of a predetermined error event pattern in said recovered data output signal to produce a filtered output signal;

adding a predetermined value to the filtered output signal when a predetermined error event pattern due to media noise occurs in said recovered data output signal;

and modifying the recovered data output signal when said filtered output signal exceeds the threshold of said threshold circuit, wherein said predetermined value in an Extended Partial Response Class 4 channel is determined from the following table:

| | Recovered Write Current $\hat{c}(k)$ | | | Output |
|---|---|---|---|---|
| k | −1 | 0 | 1 | |
| | 0 | X | 0 | Ajitter |
| | 1 | X | 1 | −Ajitter |
| | Others | | | 0 | and the polarity is determined from the following table:

| Polarity check | | |
|---|---|---|
| Amplitude | Polarity | Correction |
| *fexA* > VthA | FexA > 0 | 0  1 |
|  | FexA < 0 | 1  0 | where x is either 1 or 0.

6. A post-processor circuit for use in a sampled data read channel of a mass data storage device of the type using a Viterbi detector that receives an actual sampled partial response target signal from a storage medium of said mass data storage device to produce a recovered data output signal, comprising:

an error pattern detector to generate an error pattern event indicating signal if a predetermined error event pattern occurs in said sampled partial response target signal;

a circuit for generating an error signal based upon a difference between said recovered data output signal and a delayed said actual sampled partial response target signal;

a circuit for adding a predetermined value to the error signal when a predetermined error event pattern due to media noise occurs in said recovered data output signal;

a threshold circuit to generate an error correction control signal if a magnitude of said error signal exceeds a predetermined threshold;

and an error correction circuit to modify the recovered data output signal when said error correction control signal and said error event pattern indicating occurrence signal are generated, wherein said predetermined value in an EEPR4 channel is determined from the following tables:

| Recovered Write Current ĉ(k) | | | | | | | | |
|---|---|---|---|---|---|---|---|---|
| k | −3 | −2 | −1 | 0 | 1 | 2 | 3 | Output |
|  | X | 0 | 0 | X | 0 | 0 | X | Ajitter |
|  | 1 | 1 | 0 | X | 0 | 0 | X |  |
|  | X | 0 | 0 | X | 0 | 1 | 1 |  |
|  | X | 1 | 1 | X | 1 | 1 | X | −Ajitter |
|  | 0 | 0 | 1 | X | 1 | 1 | X |  |
|  | X | 1 | 1 | X | 1 | 0 | 0 |  |
|  | Others |  |  |  |  |  |  | 0 |

| Polarity Check | | | | Correction | |
|---|---|---|---|---|---|
| Amplitude | Polarity | ĉ(0) | ĉ(1) | ĉ(0) | ĉ(1) |
| *fexA(6)* >VthA | FexA(6) > 0 | 0 | X | 1 | X |
|  | FexA(6) < 0 | 1 | X | 0 | X |
| *FexB(6)* >VthA | FexA(6) > 0 | 0 | 1 | 1 | 0 |
|  | FexA(6) < 0 | 1 | 0 | 0 | 1 | wherein the polarity check correction table is logically or'd with the output of the recovered write current ĉ(k) table to produce a correction value where x is either 1 or 0.

7. The circuit of claim 6 wherein said Viterbi detector has a partial response level of at least Extended Partial Response Class 4.

8. The circuit of claim 6 wherein said Viterbi detector has a partial response level of at least EEPR4.

9. A post-processor circuit for use in a sampled data read channel of a mass data storage device of the type using a Viterbi detector that receives an actual sampled partial response target signal from a storage medium of said mass data storage device to produce a recovered data output signal, comprising:

an error pattern detector to generate an error pattern event indicating signal if a predetermined error event pattern occurs in said sampled partial response target signal;

a circuit for generating an error signal based upon a difference between said recovered data output signal and a delayed said actual sampled partial response target signal;

a circuit for adding a predetermined value to the error signal when a predetermined error event pattern due to media noise occurs in said recovered data output signal;

a threshold circuit to generate an error correction control signal if a magnitude of said error signal exceeds a predetermined threshold;

and an error correction circuit to modify the recovered data output signal when said error correction control signal and said error event pattern indicating occurrence signal are generated, wherein said predetermined value in an EPR4 channel is determined from the following table:

| Recovered Write Current ĉ(k) | | | | |
|---|---|---|---|---|
| k | −1 | 0 | 1 | Output |
|  | 0 | X | 0 | Ajitter |
|  | 1 | X | 1 | −Ajitter |
|  | Others |  |  | 0 | and the polarity is determined from the following table:

| Polarity check | | |
|---|---|---|
| Amplitude | Polarity | Correction |
| *fexA* > VthA | FexA > 0 | 0  1 |
|  | FexA < 0 | 1  0 | where x is either 1 or 0.

* * * * *